United States Patent [19]

Gifford

[11] Patent Number: 5,082,713

[45] Date of Patent: Jan. 21, 1992

[54] WIDE MONOFILAMENT REINFORCING CORDS EMPLOYING HIGH PERFORMANCE THERMOPLASTICS AND TIRE BELTS MADE THEREFROM

[75] Inventor: James H. Gifford, Orange, Conn.

[73] Assignee: Pirelli Armstrong Tire Corporation, New Haven, Conn.

[21] Appl. No.: 557,422

[22] Filed: Jul. 23, 1990

[51] Int. Cl.⁵ .................... B32B 5/12; B32B 5/26; B32B 5/28

[52] U.S. Cl. .................... 428/107; 428/109; 428/112; 428/114; 428/397; 152/527; 152/535; 152/536

[58] Field of Search .............. 152/527, 536, 535; 428/105, 107, 109, 112, 394, 395, 396, 397, 110, 114

[56] References Cited

U.S. PATENT DOCUMENTS

| | | |
|---|---|---|
| 1,132,634 | 3/1915 | Subers . |
| 1,188,062 | 6/1916 | Gammeter . |
| 2,257,604 | 9/1941 | Harrah . |
| 2,257,646 | 9/1941 | Pierce . |
| 2,640,523 | 6/1953 | Palmer . |
| 3,431,962 | 3/1969 | Kersker et al. . |
| 3,570,575 | 3/1971 | Marker et al. ............ 152/536 |
| 3,667,529 | 6/1972 | Mirtain . |
| 3,786,851 | 1/1974 | Mirtain et al. . |
| 4,173,991 | 11/1979 | Mirtain . |
| 4,258,774 | 3/1981 | Mirtain et al. . |
| 4,349,063 | 9/1982 | Kikuchi et al. . |
| 4,488,587 | 12/1984 | Umezawa et al. . |
| 4,606,392 | 9/1986 | Weidenhaupt et al. . |
| 4,609,024 | 9/1986 | Yatsunami et al. . |
| 4,679,387 | 7/1987 | Weidenhaupt et al. . |
| 4,702,294 | 10/1987 | Kubica et al. . |
| 4,709,544 | 12/1987 | Kindry et al. . |
| 4,733,708 | 3/1988 | Kindry et al. ............ 152/527 |
| 4,957,799 | 9/1990 | Miyamoto et al. ......... 152/536 |

Primary Examiner—Alexander S. Thomas
Attorney, Agent, or Firm—St. Onge Steward Johnston & Reens

[57] ABSTRACT

A pneumatic tire reinforced by a reinforcing belt is provided, the reinforcing belt having at least one cord reinforced ply, and, in turn, the cord reinforced ply having a plurality of substantially parallel spaced apart elongated cross-section reinforcing cords. The ply may be a bias ply in which the reinforcing cords are disposed at a bias angle, or it may be an overlay ply being axially longer than any other plies and having curving ends which overlay and curve over the ends of any other plies to strengthen shoulder portions of the pneumatic tire. Preferably, in the case of an overlay ply, the reinforcing cords are disposed substantially circumferentially. Preferably also, the elongated cross-section of the reinforcing cords is elliptic; and, the reinforcing cords are thermoplastic monofilaments formed by extrusion.

27 Claims, 2 Drawing Sheets

WIDE MONOFILAMENT REINFORCING CORDS EMPLOYING HIGH PERFORMANCE THERMOPLASTICS AND TIRE BELTS MADE THEREFROM

FIELD OF THE INVENTION

This invention relates to cords for reinforcing pneumatic tires and, more particularly, to cords whose width is greater than its height and belts made therefrom for reinforcing pneumatic tires.

BACKGROUND ART

Reinforcing cords and belts made therefrom for reinforcing pneumatic tires are well known in the art. A wide variety of materials and configurations have been suggested for utilization in pneumatic tire constructions in an effort to provide reinforcing belts which are thin and light yet demonstrate a high resistance to lateral movement.

U.S. Pat. No. 2,257,646 to Pierce discloses tension elements formed from a flattened core of rubber or similar plastic surrounded by and bound to a wire braid.

U.S. Pat. No. 3,431,962 to Kersker et al. discloses reinforcement elements which comprise a strip of non-circular cross-section having a multiplicity of continuous parallel untwisted filaments adhesively bonded or compacted together. The thickness of the strip is advantageously one-fifth to one-twenty-fifth its width.

U.S. Pat. No. 3,667,529 to Mirtain discloses a single-layer ply structure of metallic wires or strips oriented at a substantial bias angle as an adjunct to a multi-layer belt of textile cord plies oriented substantially circumferentially.

U.S. Pat. No. 3,786,851 to Mirtain et al. discloses a breaker having a plural-layer ply of non-metallic cords oriented at 0° superposed on a plural-layer ply of metallic strips crossed relative to those in the adjacent layer and oriented from 16° to 30°.

U.S. Pat. No. 4,349,063 to Kikuchi et al. discloses a pneumatic radial tire reinforced with steel cords which have a flat or elliptic section. The cords comprise two or three strands, each strand produced by twisting plural filaments, arranged in parallel to form a core about which additional filaments are twisted.

U.S. Pat. No. 4,609,024 to Yatsunami et al. discloses a cord comprising a core of two metallic wires and an outer layer of six metallic wires, all of which have the same diameter.

U.S. Pat. No. 4,733,708 to Kindry et al. discloses a tread reinforcing belt structure of a pneumatic tire having at least one ply of flat steel wire. A radial outward ply of non-metallic cords such as heat shrinkable nylon is disclosed in several embodiments.

Some prior art tires have reinforcing belts including reinforcing cords with round cross-sections. Round cross-section textile cords are most commonly used in applications requiring fuel efficient or other lightweight tires, while steel cords are most commonly used in applications requiring prolonged tread life or other rugged wear tires. Other prior art tires have reinforcing belts including reinforcing monofilament cords with flattened cross-sections that are generally formed from steel. Disadvantages of these steel cords are their weight, which decreases fuel economy, and their stiffness which decreases fatigue performance.

SUMMARY OF THE INVENTION

It is accordingly an object of this invention to provide a reinforcing belt which is both thin and lightweight. It is a further object of this invention to provide a non-metallic reinforcing cord for such belts and for pneumatic tires having an elongated cross-section. It is another object of this invention to provide a reinforcing belt having an overlay ply which is reinforced by monofilament cords having elongated cross-sections.

These and other objects are achieved by the provision of a pneumatic tire reinforced by a reinforcing belt, the reinforcing belt having at least one cord reinforced ply, and, in turn, the cord reinforced ply having a plurality of substantially parallel spaced apart elongated cross-section reinforcing cords. Advantageously, the reinforcing cords are formed of a material selected from the group consisting of nylons, polyesters, polyetherether ketones (PEEK), imides and especially high temperature imides, polyphenylene sulfide (PPS) and polyphenylene ethers (PPE). Preferably, the reinforcing cords are formed from a nylon. The ply may be a bias ply in which the reinforcing cords are disposed at a bias angle, or it may be an overlay ply being axially longer than any other plies and having curving ends which overlay and curve over the ends of any other plies to strengthen then shoulder portions of the pneumatic tire and reduce dynamic standing wave effects.

Preferably, in the case of an overlay ply, the reinforcing cords are disposed substantially circumferentially. The elongated cross-section of the reinforcing cords comprise a width (W) which is preferably greater than or equal to two times a height (H) of the reinforcing cord and, most preferably, also less than or equal to three times the height (H). Preferably, the elongated cross-section of the reinforcing cords is elliptic. The reinforcing cord is preferably a monofilament and formed by extrusion.

Plies formed from elongated cross-section reinforcing cords improve the handling of pneumatic tires in which they are placed by resisting lateral movement and developing higher cornering force, and also extend the useful life of pneumatic tires by providing a thinner and thus lighter reinforcing belt to reduce heat build-up. Overlay plies formed from elongated cross-section cords include the additional advantage of reducing the standing wave of pneumatic tires in which they are placed to further extend the useful life of the pneumatic tire by reducing heat build-up. Similarly, bias plies for belts formed from elongated cross- section reinforcing cords include the additional advantage of reducing the amount of cord material needed to reinforce each bias belt ply.

The invention and its particular features will become more apparent from the following detailed description when considered with reference to the accompanying drawings.

DETAILED DESCRIPTION

Figure 1:
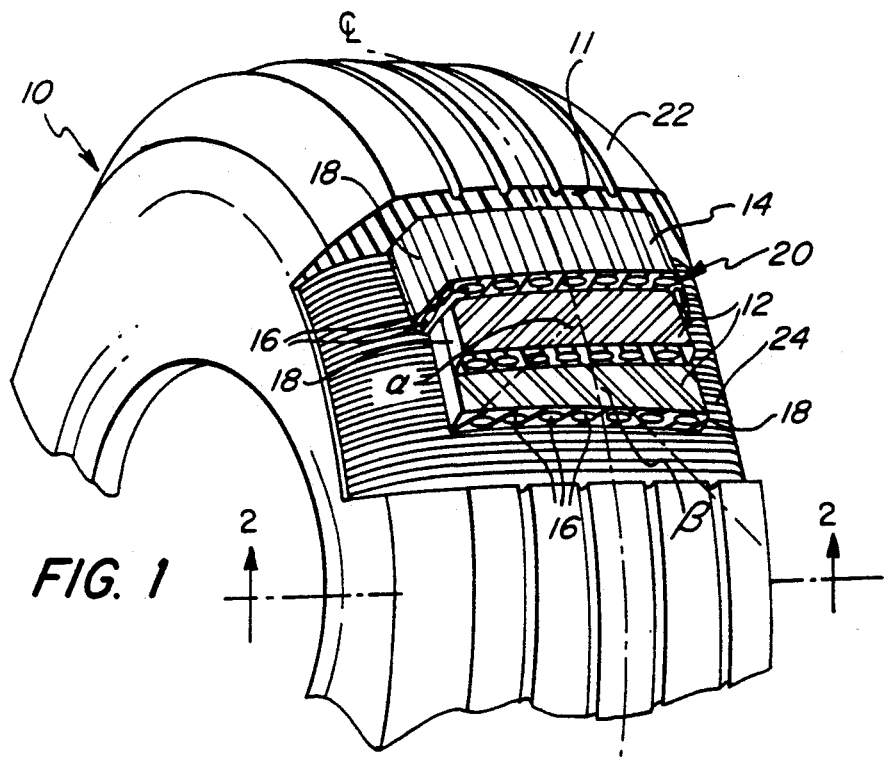
FIG. 1 is a perspective partial cutaway view of a pneumatic tire revealing an illustrative belt package having a pair of bias plies and an overlay ply all of which are reinforced with elongated cross-section reinforcing cords in accordance with this invention.

Referring to FIG. 1, a pneumatic tire 10 is shown in a perspective view partially cutaway in a crown portion 11 thereof to reveal bias plies 12 and an overlay or cap ply 14. Each of the plies 12 and 14 includes a plurality of substantially parallel spaced apart reinforcing cords 16 in accordance with this invention which are bound together in a matrix 18 of rubber, or like elastomeric or polymeric material. Taken as a whole, plies 12 and 14 comprise a reinforcing belt or belt package 20 for reinforcing pneumatic tire 10 and stabilizing crown portion 11. Reinforcing belt 20 is disposed within pneumatic tire 10 in crown portion 11 thereof between a tread portion 22 and a carcass portion 24 of the tire.

Although FIG. 1 illustrates a belt package having two bias plies and one overlay ply, pneumatic tires reinforced with either one or more bias plies, or one or more overlay plies, or one or more bias plies and one or more overlay plies all of which are reinforced with reinforcing cords 16. Further, any of these belt packages may include one or more prior art plies.

Reinforcing cords 16 of bias plies 12 are inclined at an angle with respect to the centerline of pneumatic tire 10. Preferably the reinforcing cords in each of the bias plies cross such that the reinforcing cords of one ply cross the centerline in a direction opposite to the direction in which the reinforcing cords of the other ply cross the centerline. Further, and as illustrated, the reinforcing cords of the radially outermost bias ply intersect the centerline at a bias angle or cord angle alpha while the reinforcing cords of the radially innermost bias ply intersect the centerline at a bias angle or cord angle beta.

Bias angles may range between about 10° to about 30° and preferably between about 15° to about 25°. The magnitude of the bias angles will generally affect the tires cornering capabilities. Preferably also, angles alpha and beta are approximately equivalent in magnitude.

Figure 2:
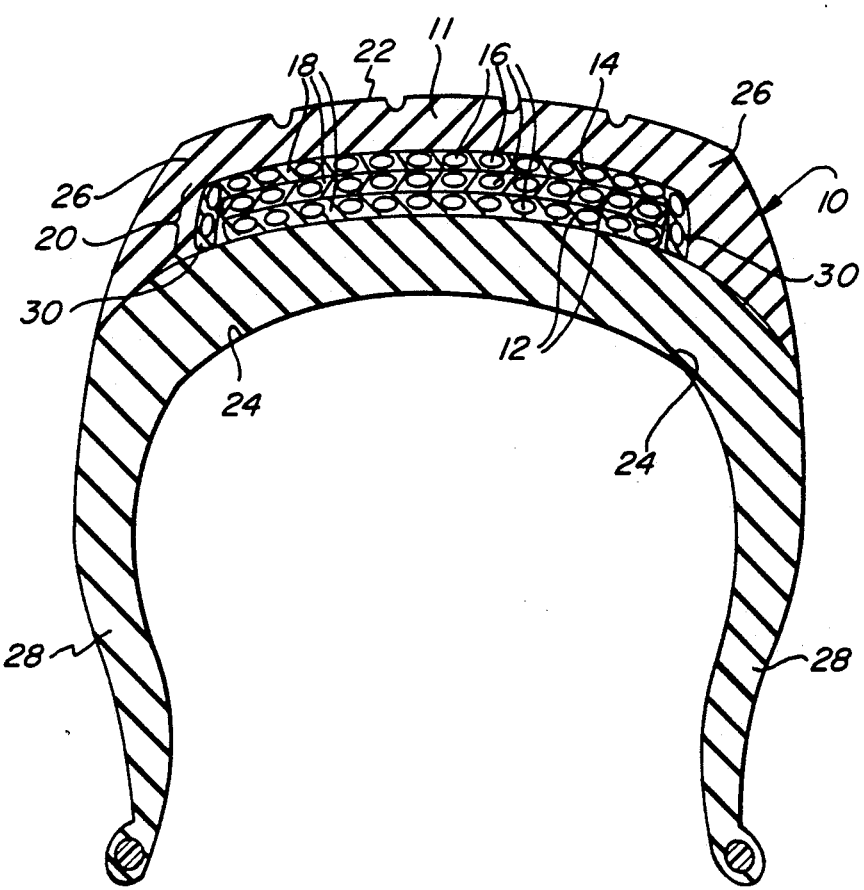
FIG. 2 is a cross-sectional view of the pneumatic tire of FIG. 1 taken along plane 2—2 in FIG. 1.

Reinforcing cords 16 of overlay ply 14, however, are preferably aligned substantially parallel to the centerline, or substantially circumferential about pneumatic tire 10. As illustrated in FIG. 2, a cross-sectional view of pneumatic tire 10, cap or overlay ply 14 is both the radially outermost and axially longest ply of reinforcing belt or belt package 20. Overlay ply 14 helps to integrate the belt package into the tire construction by reinforcing shoulder portions 26 of pneumatic tire 10 between tread portion 22 and side walls 28. Without an overlay ply, shoulder portions 26 of pneumatic tire 10 may be subjected to potentially destructive shear stresses due to the abrupt end of both tread portion 22 and belt package 20. With an overlay ply, shoulder portions 26 are reinforced by curving ends 30 of overlay ply 14 which curve over the ends of any other plies in the belt package and into the shoulder portions of the pneumatic tire to reduce any destructive shear stresses. Curving ends 30 of overlay ply 14 effectively extend, in a tapering fashion, the reinforcement of belt package 20 from tread portion 22 into shoulder portions 26 of the pneumatic tire.

Aside from considerations of cost, reinforcing cords 16 advantageously may be formed from polyesters, nylons, polyether ether ketones (PEEK), imides and especially high temperature imides, polyphenylene sulfide (PPS), polyphenylene ethers (PPE), and other thermoplastics, a number of which are used in aircraft structures. Preferably, reinforcing cords 16 are formed from high performance thermoplastic resins such as nylons and PPE. While it is believed PPE would be most preferred because of its superior physical properties and because it binds directly to rubber compositions commonly used in pneumatic tire compositions, nylon is preferred because PPE is not now readily available in filament form.

One such rubber composition, to which PPE directly binds, comprises in parts by weight: 100 parts SBR, 25.0 parts carbon black, 3.00 parts aromatic oil, 4.00 parts zinc oxide, 1.00 part stearic acid, 1.50 parts sulfur, and 1.30 parts DCBS or like accelerator. It is believed that PPE compositions 1900 and 2000 sold under the trademark VESTORAN® by Huls Aktiengesellschaft would be suitable for cord filaments.

Figure 3:
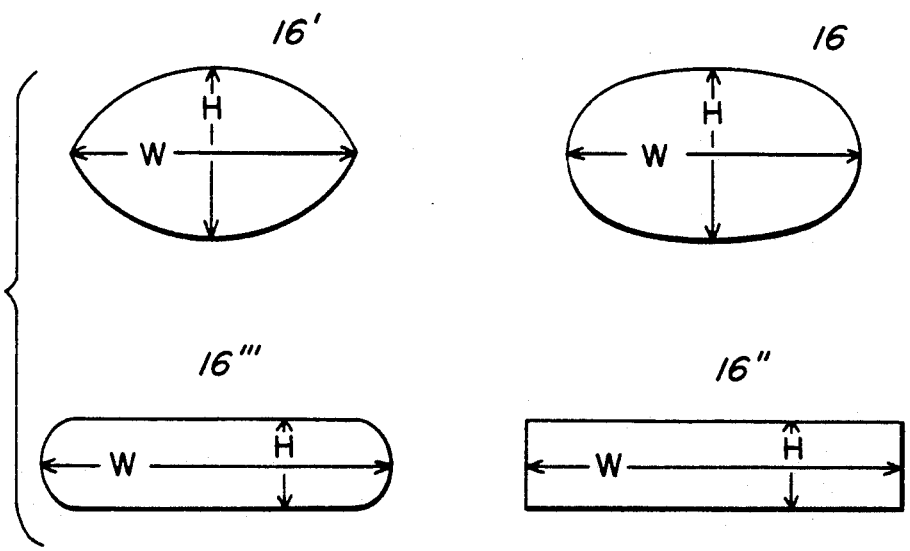
FIG. 3 is an illustrative array of enlarged cross-sections of a variety of possible reinforcing cords in accordance with this invention.

Reinforcing cords 16 preferably have elongated cross-sections. FIG. 3 provides an illustrative array of possible reinforcing cord elongated cross-sections enlarged to clarify their particular configurations. The preferred reinforcing cord 16 has a substantially elliptic cross-section. Reinforcing cord 16' has a substantially lemon-shaped cross-section while reinforcing cord 16" has a substantially rectangular cross-section and reinforcing cord 16''' has a substantially oblong cross-section.

By elongated is meant that a width of the reinforcing monofilament cord indicated as W is larger than a height of the reinforcing cord indicated as H. The width (W) is preferably greater than or equal to two times the height (H) of the reinforcing cord. Most preferably, the width (W) is greater than or equal to two times and less than or equal to three times the height (H) of the reinforcing cord. Further, width (W) and height (H) each preferably ranges between about 0.010 inches to about 0.045 inches, and most preferably ranges between 0.013 inches to 0.039 inches.

Reinforcing cords 16 may be formed from a plurality of filaments or monofilaments, but preferably are a single monofilament. Further, reinforcing cords 16 may be gel-spun, molded, die or otherwise cut from a sheet, but preferably are extruded. Thus, when considering both composition and method of manufacture, the most preferred reinforcing cord is extruded nylon monofilament having an 15 elongated cross-section. Dupont De Nemours, Inc., sells such a material under the trademark HYTEN ® which has been found to be effective. HYTEN ® has a width (W) of 0.-inches and a height (H) of 0.037 inches. Hyten ® is a high tenacity nylon monofilament product.

Reinforcing belts made from plies including elongated cross-section reinforcing cords 16 offer significant advantages over reinforcing belts made from plies including prior art belt reinforcing cords. Some prior art belt reinforcing cords have round cross-sections with diameters which are longer than the height (H) of elongated cross-section reinforcing cords 16. Diameters of round cross-section prior art reinforcing cords range between about 0.020 inches to about 0.075 inches. Other prior art belt reinforcing cords have flattened cross-sections, however, these prior art belt reinforcing cords are typically formed from steel.

Disadvantages of steel reinforcing cords include their weight and flex fatigue. Steel cords weigh between about four to about five times as much as thermoplastic cords of similar strength. Although flattened cross-section steel monofilament cords would enable thinner plies and thus thinner belts, their increased weight reduces fuel efficiency.

One disadvantage of round cross-section prior art reinforcing cords is that plies including such cords and thus reinforcing belts including such plies are necessarily radially thicker than reinforcing belts including one or more plies of elongated cross-section reinforcing cords. For example, an average thickness for a ply reinforced with typical prior art cords is between about 0.020 inches to about 0.075 inches, whereas an average thickness for a ply reinforced with elongated cross-section reinforcing cords is between about 0.01 inches to about 0.045 inches.

Plies having cords in accordance with the invention provide better handling and response characteristics due to increased torsional rigidity of the cords. In addition, use of such cords provides for a thinner belt ply resulting in a cooler running belt, thus extending the useful life of the tire. Further, thinner plies require less rubber or like polymeric or elastomeric matrix material and thus are lighter than prior art plies, resulting in increased fuel efficiency.

Because the width (W) of elongated cross-section reinforcing cords 16 is generally larger than the diameter of typical round cross-section prior art reinforcing cords, elongated cross-section reinforcing cords 16 resist lateral forces better than round cross-section prior art reinforcing cords. Lateral forces are frequently generated within tires during dynamic conditions such as cornering. The added resistance to lateral forces of elongated cross-section reinforcing cords 16 thus further improves the cornering capabilities and durability of pneumatic tires reinforced therewith over pneumatic tires reinforced with round cross-section prior art reinforcing cords in a similar configuration.

Bias plies 12 formed from elongated cross-section reinforcing cords 16 offer other advantages. Because elongated cross-section reinforcing cords 16 resist lateral forces better than round cross-section prior art reinforcing cords, plies having relatively smaller bias or crown angles (as measured from tire centerline and considering that the radial carcass ply is 0°) may provide substantially the same cornering force as prior art plies with relatively larger crown angles. Reductions in the crown angle necessary to develop the desired cornering force lead to reductions in the amount of reinforcing cord used in each ply and thus to more economic pneumatic tire constructions.

Overlay ply 14 formed from elongated cross-section reinforcing cords 16 offers other advantages as well. By providing a relatively radially thinner overall belt package which is better integrated into the pneumatic tire, overlay plies with elongated cross-section reinforcing cords 16 would help reduce the standing wave of a pneumatic tire in which it is placed thereby reducing heat build-up which may reduce the useful life of the pneumatic tire and also provide better handling.

Although the invention has been described with reference to particular embodiments, features, materials of construction and the like, these are not intended to exhaust all possible features, and indeed many other modifications and variations will be ascertainable to those of skill in the art without departing from the scope of the invention as defined in the appended claims.

What is claimed is:

1. A reinforcing belt for a pneumatic tire having shoulder portions, the reinforcing belt comprising:
at least two cord reinforced plies;
each ply having a plurality of substantially parallel spaced apart reforcing cords bound together in a matrix of an elastomeric material;
said reinforcing cords comprised of a material selected from the group consisting of nylons, polyesters, and polyphenylene ethers;
said plurality of reinforcing cords of said cord reinforced plies disposed to cross said plurality of reinforcing cords of any adjacent cord reinforced ply; and
each of said plurality of reinforcing cords having a substantially elliptic cross-section to improve handling of pneumatic tires in which the reinforcing belt is placed by resisting lateral movement and developing cornering force, and also to extend the useful life of pneumatic tires in which the reinforcing belt is placed by providing a relatively thin and light reinforcing belt to reduce heat build-up, and also to reduce the amount of cord material needed to reinforce said cord reinforced plies.

2. The reinforcing belt of claim 1 wherein the substantially elliptic cross-section of each of said plurality of reinforcing cords has a width (W) which is greater than or equal to two times a height (H) of each of said plurality of reinforcing cords.

3. The reinforcing belt of claim 2 wherein both said width (W) and said height (H) each ranging between about 0.010 inches and about 0.045 inches.

4. The reinforcing belt of claim 1 wherein each of said plurality of reinforcing cords in an extruded monofilament.

5. The reinforcing belt of claim 1 wherein the material of each of said plurality of reinforcing cords is a thermoplastic.

6. The reinforcing belt of claim 1 wherein each of said plurality of reinforcing cords is a high tenacity nylon monofilament.

7. The reinforcing belt of claim 1 wherein the substantially elliptic cross-section of each of said plurality of reinforcing cords has a width (W) which is less than or equal to three times a height (H) of each of said plurality of reinforcing cords, both said width (W) and said height (H) each ranging between 0.013 inches to 0.039 inches.

8. The reinforcing belt of claim 1 including a cord reinforced sustantially circumferential ply situated radially outward of said two cord reinforced plies, said cord reinforced substantially circumferential ply being axially longer than said two cord reinforced plies for overlaying said two crod reinforced plies and strengthening the shoulder portions of the pneumatic tire.

9. An improved reinforcing belt for a pneumatic tire, the pneumatic tire having a carcass extending between a pair of side walls, each side wall terminating in a bead portion, and having a tread disposed radially outward of the carcass, the tread connected to the side walls by shoulder portions, the reinforcing belt disposed radially between the carcass and the tread and being of the type having at least two cord reinforced bias plies and a cord reinforced substantially circumferential ply situated radially outward of the cord reinforced bias plies, the cord reinforced substantially circumferential ply including a plurality of reinforcing cords bound together in a matrix of polymeric material the cord reinforced substantially circumferential ply being axially longer than the cord reinforced bias plies for overlaying the cord reinforced bias plies and strengthening the shoulder and crown portions of the pneumatic tire, wherein the improvement comprises:

said reinforcing cords comprised of a material selected from the group consisting of nylons, polyesters, and polyphenylene ethers; and each of said plurality of reinforcing cords having a substantially elliptic cross-section to improve handling of pneumatic tires in which the reinforcing belt is placed by resisting lateral movement and developing an increase in cornering force, and also to extend the useful life of pneumatic tires in which the reinforcing belt is placed both by providing a relatively thin and light reinforcing belt, by reducing the standing wave of the pneumatic tire to reduce heat build-up and generally stabilizing the crown portion of the tire.

10. The improved reinforcing belt of claim 9 wherein each of said plurality of reinforcing cords is an extruded monofilament.

11. The improved reinforcing belt of claim 9 wherein the material of each of said plurality of reinforcing cords is a thermoplastic.

12. The improved reinforcing belt of claim 9 wherein each of said plurality of reinforcing cords is a high tenacity nylon monofilament.

13. The improved reinforcing belt of claim 9 wherein the elongated cross-section of each of said plurality of reinforcing cords has a width (W) which is greater than or equal to two times a height (H) of each of said plurality of reinforcing cords, both said width (W) and said height (H) each ranging between about 0.010 inches and about 0.045 inches.

14. The improved reinforcing belt of claim 9 wherein the substantially elliptic cross-section of each of said plurality of reinforcing cords has a width (W) which is less than or equal to three times a height (H) of each of said plurality of reinforcing cords.

15. A reinforcing belt for a pneumatic tire having shoulder portions, the reinforcing belt comprising:

at least one cord reinforced ply having a plurality of reinforcing cords bound together in a matrix of an elastomeric material;

said reinforcing cords comprised of a material selected from the group consisting of nylons, polyesters, and polyphenylene ethers;

each of said plurality of reinforcing cords having a substantially elliptic cross-section to improve handling and useful life of pneumatic tires in which the reinforcing belt is placed; and said substantially elliptic cross-section having a width (W) which is greater than or substantially equal to two times a height (H) of each of said plurality of reinforcing cords;

said width (W) of said plurality of reinforcing cords aiding to resist lateral movement and develop cornerning force of pneumatic tires in which the reinforcing belt is placed while said height (H) permits the reinforcing belt to be relatively thin and lightweight to reduce heat build-up and the amount of cord material needed to reinforce pneumatic tires in which the reinforcing belt is placed.

16. The reinforcing belt of claim 15 wherein said reinforcing cords are extruded.

17. The reinforcing belt of claim 15 wherein said width (W) is less than or substantially equal to three times said height (H).

18. The reinforcing belt of claim 15 wherein each of said plurality of reinforcing cords is a nylon monofilament.

19. A reinforcing belt for a pneumatic tire comprising:

at least one cord reinforced ply having a plurality of reinforcing cords bound together in a matrix of an elastomeric material;

said reinforcing cords comprised of a material selected from the group consisting of nylons, polyesters and polyphenylene ethers;

said reinforcing cords having a substantially elliptic cross-section to improve handling and useful life of pneumatic tires in which the reinforcing belt is placed; and said substantially elliptic cross-section having a width (W) which is greater than or substantially equal to two times a height (H) of said reinforcing cords.

20. The reinforcing belt of claim 19 wherein said width (W) is less than or substantially equal to three times said height (H).

21. The reinforcing belt of claim 19 wherein said reinforcing cords are extruded.

22. The reinforcing belt of claim 19 wherein said reinforcing cords comprise a nylon.

23. The reinforcing belt of claim 19 wherein said reinforcing cords comprise a polyphenylene ether.

24. A reinforcing belt for a pneumatic tire having shoulder portions, the reinforcing belt comprising:

at least one cord reinforced ply having a plurality of reinforcing cords bound together in a matrix of an elastomeric material;

said reinforcing cords comprised of a polyphenylene ether;

each of said plurality of reinforcing cords having an elongated cross-section to improve handling and useful life of pneumatic tires in which the reinforcing belt is placed; and said elongated cross-section having a width (W) which is greater than or substantially equal to two times a height (H) of each of said plurality of reinforcing cords;

said width (W) of said plurality of reinforcing cords aiding to resist lateral movement and develop cornering force of pneumatic tires in which the reinforcing belt is placed while said height (H) permits the reinforcing belt to be relatively thin and lightweight to reduce heat build-up and the amount of cord material needed to reinforce pneumatic tires in which the reinforcing belt is placed.

25. The reinforcing belt of claim 24 wherein said reinforcing cords are extruded.

26. The reinforcing belt of claim 24 wherein said width (W) is less than or substantially equal to three times said height (H).

27. The reinforcing belt of claim 24 wherein said elongated corss-section is substantially elliptic.

* * * * *

UNITED STATES PATENT AND TRADEMARK OFFICE
CERTIFICATE OF CORRECTION

PATENT NO. : 5,082,713
DATED : January 21, 1992
INVENTOR(S) : James H. Gifford It is certified that error appears in the above-identified patent and that said Letters Patent is hereby corrected as shown below:

In column 4, at line 50, insert --One example of-- before "HYTEN" and replace "0.- inches" with --0.042 inches--.

In column 4, at line 50, replace "0.037" with --0.014--.

Signed and Sealed this

First Day of June, 1993

Attest:

MICHAEL K. KIRK

*Attesting Officer*   *Acting Commissioner of Patents and Trademarks*